INVENTORS
John R. Oishei and Raymond Deibel
BY
Bean, Brooks, Buckley & Bean.
ATTORNEYS Patented Oct. 7, 1952

2,613,121

UNITED STATES PATENT OFFICE 2,613,121

MOTOR

John R. Oishei, Buffalo, and Raymond Deibel, East Aurora, N. Y., assignors to Trico Products Corporation, Buffalo, N. Y.

Application March 25, 1949, Serial No. 83,486

11 Claims. (Cl. 309—22)

This invention relates to the windshield cleaning art and more particularly to the power unit field thereof.

The present day windshield cleaner is largely of the suction actuated type wherein the motor is connected to the intake manifold as a source of suction supply. The suction influence from this source is fluctuating in character ranging from a high degree of negative pressure to a deficient degree insufficient of itself to operate the windshield cleaner in a practical manner. Supplemental means have been proposed for cutting into the cleaner system during these deficient intervals in order to maintain an adequate suction head for maximum wiper efficiency. The frequency of demand for this supplemental source is determined by the wiper system load placed upon the wiper motor.

The wiper motor most generally utilized embodies a paddle or vane-like piston which is fixedly secured to the motor shaft and arranged to swing in an arcuate chamber under the reverse applications of an actuating pressure differential. A motor of this type fabricated to factory specifications will operate efficiently. However, in the mass production of motors, which involves die casting operations as well as the human factor, discrepancies appear that mitigate against a freely moving paddle. Consequently, a binding of parts occurs which results in a retarded motor action and necessitates a relatively higher degree of vacuum for satisfactory performance. This means that a supplemental source, when used, will be called upon more frequently and for longer time periods.

The primary object of this invention is to provide an improved motor which will operate efficiently on a minimum pressure differential and produce a most practical performance.

Again, the invention resides in a fluid motor which is economical to manufacture, of durable construction, and one in which the piston-forming paddle has the utmost freedom of movement.

Furthermore, the object of the invention is to provide a motor which will operate efficiently on a relatively lower vacuum and therefore will function more effectively on the fluctuating manifold suction influence for relatively longer intervals of time.

Figure 1:
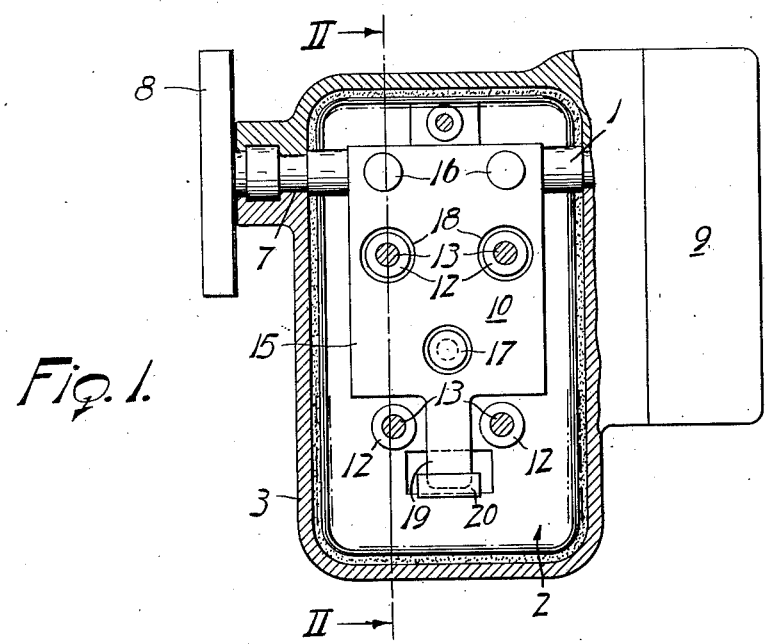
Figure 2:
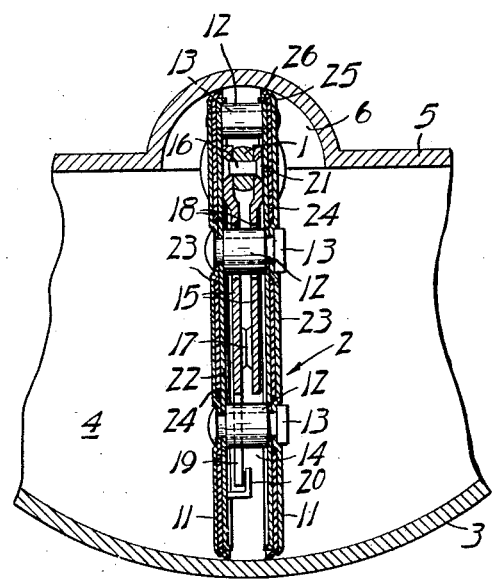

The foregoing and other objects will manifest themselves as the following description progresses, reference being had therein to the accompanying drawing, wherein Fig. 1 is a transverse section through a motor constructed in accordance with the present invention; and Fig. 2 is a cross-sectional view about on line 2—2 of Fig. 1.

Referring more particularly to the drawing, the numeral 1 designates the motor shaft, 2 the vane-like piston or paddle operatively connected to the shaft for oscillating the same, and 3 the motor casing having an arcuate chamber 4 therein. The chamber is closed by a removable section or cover 5 and is likewise formed with an arcuate chamber 6 of smaller radius for receiving the upper portion of the piston where it extends beyond the shaft. At opposite sides of the chamber 4 the shaft is journaled in bearings in the casing and its cover, as indicated at 7. One end of the shaft carries a coupling part 8 to which an accessory is connectible, such as a windshield wiper, by suitable means, not shown. The opposite end of the shaft extends within the valve chamber 9 which contains automatic snap action valve mechanism for operatively reversing the pressure differential applications on the opposite sides of the paddle, or piston, all as is well known in the automotive industry.

In accordance with the present invention the piston which heretofore has been fixedly mounted on the shaft is herein loosely connected thereto for providing a certain relative play or freedom of movement between the two parts. Therefore, should there be any misalignment or discrepancy in the relation between the shaft bearing and the walls of the motor chamber 4, 6, the piston will be free to follow the path laid out by the chamber walls while leaving the motor shaft free to oscillate in its bearings.

To this end the motor shaft is provided with a laterally extending crank part 10 loosely fitting between and embraced by the two opposed sections 11 of the piston. In order to maintain a limited freedom of movement between the crank part 10 and the piston, the sections of the latter are supported apart by interposed sustaining spacers 12 which are secured in position by rivets 13 or other suitable fasteners which serve to hold the components of the piston in assembled relation. These spacers provide a chamber 14 between the piston sections for receiving the crank part 10 for relative movement to a limited extent.

The crank part 10 may be of any suitable construction. Herein it is composed of a pair of plates 15, fixedly secured to the shaft by rivets 16 and united together at a point radial from the shaft by means of a suitable rivet or fastener 17. Should any of the fasteners 13 pass through the plates, sufficient clearance will be provided about the spacing collars 12 to permit the desired floating movement of the piston with respect to the shaft, as indicated at 18. A tongue 19 may extend from one of the plates 15 to engage behind a lug 20 on the adjacent piston plate to give a driving point of contact adjacent the outer end of the piston. The shaft embracing sections of the piston will have sliding support upon the opposite sides of the plates 15, as indicated at 21.

By reason of this limited play of the piston upon the shaft, the piston is free to float and follow the contour of the path delineated by the chamber walls free from any binding action of the piston upon such walls or of the shaft in its bearings. Therefore, the piston will respond to a smaller pressure differential head, relative to the former fixedly related parts, and thereby continue a satisfactory performance over a wide range of pressures. Maximum efficiency is therefore insured throughout longer time intervals with the result that any sluggish or retarded operation due to insufficient suction will be of brief duration and in those installations where supplemental sources of air pressure are provided, the demands made upon such supplemental sources will obviously be at less frequent intervals and for shorter time periods.

Each piston section may be of suitable construction. Herein each section comprises an inner plate 22 and an outer plate 23 with an interposed packing 24. The marginal portion of the outer plate 23 is angularly displaced or cupped, as at 25, so as to have a conforming action upon the marginal flange 26 of the packing sheet or member. In other words, the two plates 22 and 23 will nest and the turned margin 25 of the outer plate will deflect the packing flange 26 inwardly toward the companion piston section and thereby dispose the packing flange for proper contact with the motor chamber wall. This facilitates manufacture and expedites the assembly of the parts.

The motor is primarily designed for operation by suction, but may operate with satisfactory and efficient performance under superatmospheric pressure. The term "suction" therefore is used in a comprehensive sense to include a pressure greater than atmospheric. The motor operates with an easy and free action devoid of any binding which would otherwise require a labored movement. While the foregoing description has been given in detail, it is without thought of limitation since the inventive principles involved are capable of assuming other physical embodiments without departing from the spirit of the invention and the scope of the appended claims.

What is claimed is:

1. A fluid motor comprising an arcuate chamber, an oscillatory shaft journaled substantially concentrically therein, a piston oscillatable in the chamber in fluid sealed contact with the chamber wall, and a driving connection between the piston and the shaft constituting a driving coupling between the two for angular movement as a unit and embodying parts slidable in a plane radially of the shaft to enable the piston to adjust itself to any misalinement between the shaft and the chamber.

2. A fluid motor comprising a housing having opposed arcuate chambers of different radii, an oscillatory shaft journaled substantially concentric in the housing, a piston oscillatable in the chamber in fluid sealed contact with the chamber wall, said piston being in the form of a vane extending radially in opposite directions from the shaft for oscillating therewith as a unit, and a rigid crank means fixed to said shaft and slidably connecting the piston to the shaft for limited shifting movement in a plane radial of the shaft.

3. A fluid motor comprising a housing having arcuate chambers opposed to one another about a common center, an oscillatory shaft journaled concentrically in the housing, a piston oscillatable in the chamber in fluid sealed contact with the chamber wall, said shaft having a radially extending crank part, and means loosely connecting the piston to the crank part for limited relative movement in a plane radial of the shaft, to accommodate off-center misplacement of the shaft.

4. A fluid motor comprising an arcuate chamber, an oscillatory shaft journaled substantially concentric therein, and a piston oscillatable in the chamber in fluid sealed contact with the chamber wall, said shaft having a crank member fixed thereto, and said piston comprising spaced parts embracing the crank member for angular movement therewith as a unit, said piston being supported by the crank member for relative movement in a radial plane to enable the piston to adjust itself to the best working position relative to the shaft and the chamber, said crank member extending radially between said spaced parts.

5. A fluid motor comprising an arcuate chamber, an oscillatory shaft journaled substantially concentrically therein, a piston oscillatable in the chamber in fluid sealed contact with the chamber wall, said piston comprising spaced parts loosely embracing the shaft, and a crank part fixed to the shaft and extending radially therefrom between the spaced parts of the piston to constitute a driving connection between the latter and the shaft.

6. A fluid motor comprising an arcuate chamber, an oscillatory shaft journaled substantially concentrically therein, a piston oscillatable in the chamber in fluid sealed contact with the chamber wall, a rigid crank part fixed to the shaft and extending outwardly therefrom, said piston driving said crank at laterally spaced points of contact and having sliding contact therewith in a plane radial of the shaft permitting of limited relative movement between the two whereby the piston may float in the chamber and adjust itself to the best working position relative thereto and to the shaft.

7. A fluid motor comprising an arcuate chamber, an oscillatory shaft journaled substantially concentrically therein, a piston oscillatable in the chamber in fluid sealed contact with the chamber wall, a plate fixed to the shaft and extending radially therefrom, said piston comprising spaced sections arranged on opposite sides of the plate, and fastening means uniting the piston sections together and passing through openings in the plate in a manner to enable relative movement between the piston and the plate.

8. A fluid motor comprising an arcuate chamber, an oscillatory shaft journaled substantially concentrically therein, a piston oscillatable in the chamber in fluid sealed contact with the chamber wall, said piston comprising spaced sections extending on opposite sides of the shaft, and a rigid crank fixed to the shaft and disposed between the sections to constitute a driving connection for imparting oscillatory movement to the shaft, said sections having slidable support on the crank permitting limited radial movement of the piston substantially in the plane of the axis of oscillation whereby the piston may float in the chamber and adjust itself to the best working position relative thereto and to the shaft.

9. A fluid motor comprising an arcuate chamber, an oscillatory shaft journaled substantially concentrically therein, a radially disposed piston movable back and forth in the chamber in fluid sealed contact with the chamber wall, and a rigid member on the shaft supporting the piston for axial and in and out radial movement relative to the shaft and constraining the piston to movement in a plane radial of the shaft whereby the piston remains operatively disposed throughout its self-adjustment upon the shaft incidental to any variance between the chamber wall and the shaft mounting whereby the piston may float in the chamber and adjust itself to the best working position relative thereto and to the shaft.

10. A fluid motor comprising an arcuate chamber, an oscillatory shaft journaled therein, a piston movable back and forth in the chamber in fluid sealed contact with the chamber wall, said piston being in the form of a vane extending radially from the shaft and lying substantially in the plane of the axis of oscillation, and a radially extending rigid member fixedly related to the shaft and supporting the piston for limited movement in a plane radial of the shaft whereby the piston may float in the chamber and adjust itself to the best working position relative thereto and to the shaft.

11. A fluid motor comprising an arcuate chamber, an oscillatory shaft journaled therein and fixedly carrying a rigid radial part within the chamber, and a piston movable back and forth in the chamber in fluid sealed contact with the chamber wall and having spaced body plates receiving the shaft and said radial part for limited relative movement, said radial part constraining the piston to axial and radial movement in the radial plane of said part whereby the piston may float in the chamber and adjust itself to the best working position relative thereto and to the shaft, while supporting the piston operative in the chamber, one of said body plates interlocking with the shaft to limit the axial movement of the piston thereon.

JOHN R. OISHEI.
RAYMOND DEIBEL.

REFERENCES CITED

The following references are of record in the file of this patent:

UNITED STATES PATENTS

| Number | Name | Date |
| --- | --- | --- |
| 2,012,817 | Horton | Aug. 27, 1935 |
| 2,285,621 | Sibley | June 9, 1942 |
| 2,322,963 | Horton | June 29, 1943 |

FOREIGN PATENTS

| Number | Country | Date |
| --- | --- | --- |
| 465,717 | Germany | Sept. 24, 1928 |